United States Patent [19]

Yoshimoto et al.

[11] Patent Number: 5,287,450
[45] Date of Patent: Feb. 15, 1994

[54] VIDEO SIGNAL BRANCHER

[75] Inventors: Yasuhiro Yoshimoto; Kiyoshi Takakuwa, both of Fukuyama, Japan

[73] Assignee: Mitsubishi Denki Kabushiki Kaisha, Tokyo, Japan

[21] Appl. No.: 831,754

[22] Filed: Feb. 10, 1992

Related U.S. Application Data

[63] Continuation of Ser. No. 375,926, Jul. 7, 1989, abandoned.

[30] Foreign Application Priority Data

Sep. 29, 1988 [JP] Japan ................... 63-242241

[51] Int. Cl.⁵ .............................................. G06F 15/62
[52] U.S. Cl. ................................. 395/163; 395/162
[58] Field of Search ............................... 395/162, 163; 364/200 MS File; 340/706, 747

[56] References Cited

U.S. PATENT DOCUMENTS

| | | | |
|---|---|---|---|
| 4,386,359 | 5/1983 | Regehr et al. | 346/35 |
| 4,787,025 | 11/1988 | Cheselka et al. | 364/200 |
| 4,851,997 | 7/1989 | Tatara | 364/200 |
| 4,860,247 | 8/1989 | Uchida et al. | 395/163 |
| 4,881,164 | 11/1989 | Hailpern et al. | 364/200 |
| 4,901,223 | 2/1990 | Rhyne | 364/200 |
| 4,935,866 | 6/1990 | Sauvajol et al. | 364/200 |
| 4,949,248 | 8/1990 | Caro | 364/200 |
| 4,953,082 | 8/1990 | Nonura et al. | 364/200 |
| 4,953,101 | 8/1990 | Kelleher et al. | 395/163 |
| 4,954,950 | 9/1990 | Freeman et al. | 364/200 |

OTHER PUBLICATIONS

IBM Technical Disclosure Bulletin vol. 20, No. 6, Nov. 1977, pp. 2275-2277; R. K. Debry and Kippenhan: "Print Authorization Matrix".

*Primary Examiner*—Phu K. Nguyen
*Attorney, Agent, or Firm*—Leydig, Voit & Mayer

[57] ABSTRACT

A video signal brancher is provided which facilitates printing of image data of video signals having dissimilar parameters. Image data is branched and sent to data output terminals. Synchronizing data signals are branched and sent to synchronizing signal output terminals. Parameters consisting of image data and synchronizing signals are stored and image data is printed based on the stored parameters.

7 Claims, 8 Drawing Sheets

VIDEO SIGNAL BRANCHER

This application is a continuation of application Ser. No. 07/375,926, filed Jul. 7, 1989, now abandoned.

BACKGROUND OF THE INVENTION

The present invention relates to a video signal brancher that is connected to a printer or the like.

The conventional constitution will now be described in conjunction with FIG. 9 which is a block diagram that illustrates a conventional video signal brancher.

In FIG. 9, the video signal brancher (1) is constituted by an image data input terminal (10), an image data branching circuit (11) connected to the image data input terminal (10), a first image data output terminal (12) connected to the image data branching circuit (11), a second image data output terminal (13) connected to the image data branching circuit (11), a synchronizing signal input terminal 14, a synchronizing signal branching circuit (15) connected to the synchronizing signal input terminal (14), a first synchronizing signal output terminal (16) connected to the synchronizing signal branching circuit (15), and a second synchronizing signal output terminal (17) connected to the synchronizing signal branching circuit (15). There are image data signal lines for each of the chrominance signals (R, G, B), and there are signal lines for each of the synchronizing signals (horizontal H, vertical V).

Operation of the above-mentioned conventional example will now be described in conjunction with FIG. 10 which is a block diagram illustrating the condition where the conventional video signal brancher (1) is being used.

In FIG. 10, a printer (2) is connected to the first image data output terminal (12) and to the first synchronizing signal output terminal (16) of the video signal brancher (1), a host computer (4) is connected to the image data input terminal (10) and to the synchronizing signal input terminal (14) of the video signal brancher (1) through a cable (3), and a CRT (6) is connected to the second image data output terminal (13) and to the second synchronizing signal output terminal (17) of the video signal brancher (1) through a cable (5).

There are many kinds of connectors at both ends of the cables (3) and (5), and the most suitable video signal brancher (1) is selected out of the corresponding plurality kinds of ones.

The types of connectors include DIN-type, D-subminiature-type, I-type, etc., and the pin numbers include 9 pins, 15 pins and so on.

A parameter of video signals produced from the host computer (4) is set by operation switches such as numeral keys that are not shown but that are provided in the printer (2) and is stored in the printer (2) such that the image data can be printed by the printer (2). This is done since the type of video signals produced by the host computer (4) vary depending upon the manufacturer.

The video signals include such types as analog and digital signals, interlace and non-interlace signals, and H.V composite and H.V separate signals. Furthermore, even the video signals of the same type have a parameter that is partly different depending upon the manufactures.

The image data branching circuit (11) branches into the CRT (6) the image data out of the video signals produced from the host computer (4), and further branches to the printer (2) the image data from the host computer (4) to the CRT (6).

The synchronizing signal branching circuit (15) branches to the CRT (6) the horizontal synchronizing signals and vertical synchronizing signals out of the video signals produced from the host computer (4), and further branches them to the printer (2) after having shaped their waveforms. FIG. 9 illustrates the case of the H.V separate signals.

As required, the printer (2) prepares output data and prints them based on a parameter that is set and input, based on image data that are input, and based on horizontal synchronizing signals and vertical synchronizing signals.

With the above-mentioned conventional video signal brancher, however, the video signals were simply branched. When video signals of dissimilar parameters were to be printed by the printer, therefore, the parameters of the video signals all had to be sent to the printer each time.

SUMMARY OF THE INVENTION

The present invention is constructed to solve the above-mentioned problems, and its object is to obtain a video signal brancher which, when the video signals having dissimilar parameters are to be printed by a printer, enables the video signals to be printed easily, efficiently and vividly without the need of at all changing the printer but by simply exchanging the video signal brancher depending upon the video signals.

As described below, the video signal brancher according to the present invention comprises:

(i) image data branching means which branches image data input from image data input terminals and sends them to first image data output terminals and to second image data output terminals;

(ii) synchronizing signal branching means which branches synchronizing signals input from synchronizing signal input terminals and sends them to first synchronizing signal output terminals and to second synchronizing signal output terminals; and (iii) parameter storage means for holding parameters of video signals consisting of said image data and synchronizing signals.

According to the present invention, the image data branching means branches the image data that are input from the image data input terminals and sends them to the first image data output terminals and to the second image data output terminals.

Further, the synchronizing signal branching means branches the synchronizing signals input from the synchronizing signal input terminals and sends them to the first synchronizing signal output terminals and to the second synchronizing signal output terminals.

The parameter storage means holds parameters of video signals consisting of the image data and the synchronizing signals, that are used in the printer.

BRIEF DESCRIPTION OF THE DRAWINGS

In the drawings, the same reference numerals represent the same or corresponding portions.

DESCRIPTION OF THE PREFERRED EMBODIMENTS

The constitution of a first embodiment will now be described in conjunction with FIG. 1 which is a block diagram that illustrates the first embodiment of the present invention, and wherein the image data input terminals (10) through up to the second synchronizing signal output terminals (17) are quite the same as those of the above-mentioned conventional brancher.

Figure 1:
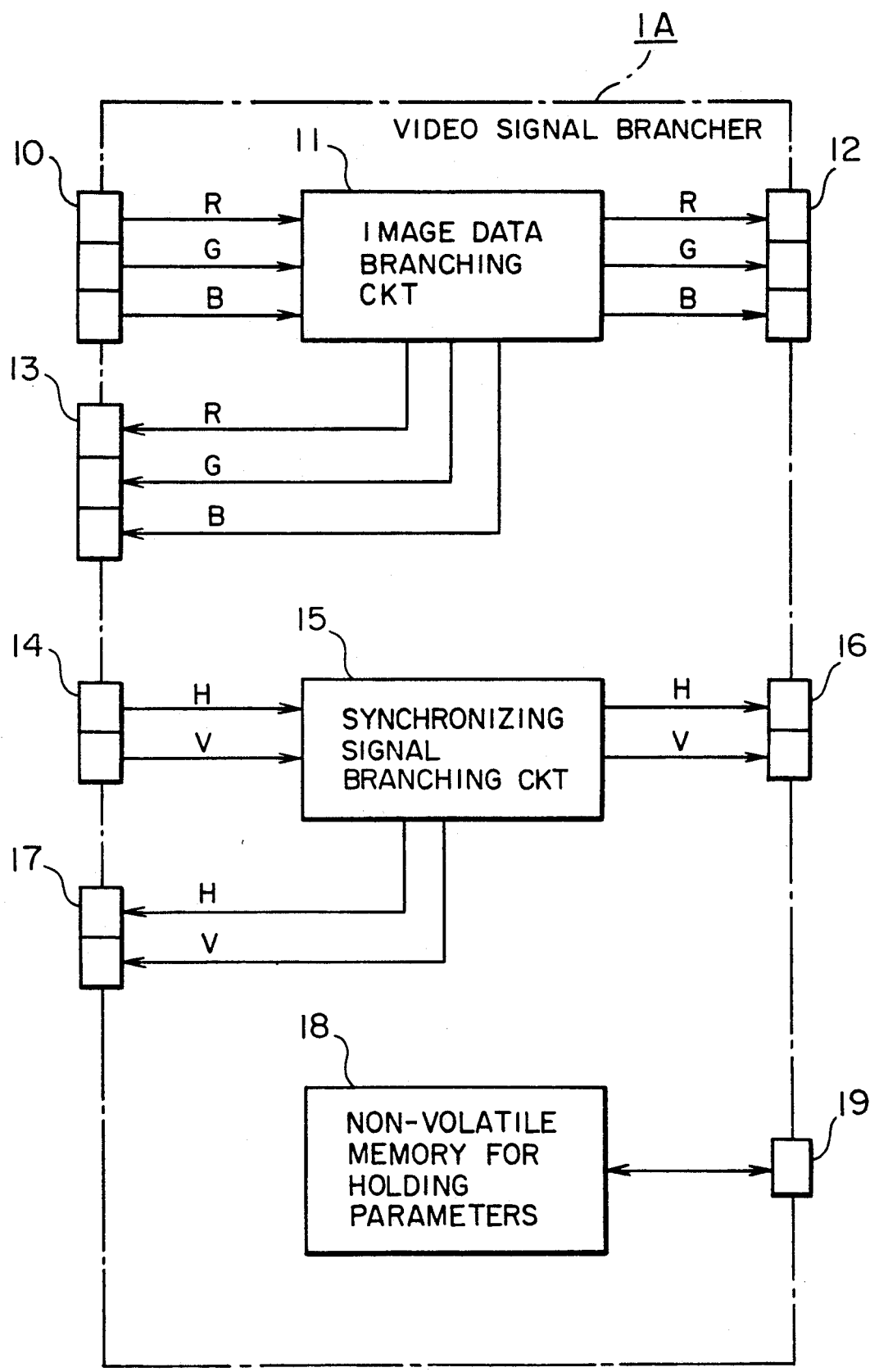
FIG. 1 is a block diagram illustrating an embodiment of the present invention.

In FIG. 1, a video signal brancher (1A) consists of image data input terminals (10) through up to second synchronizing signal output terminals (17), a non-volatile memory (EEP-ROM) (18) for holding rewritable parameters, and a parameter input/output terminal (19) connected to the non-volatile memory (18) that holds parameters. According to the first embodiment of the present invention, the image data branching means, the synchronizing signal branching means and the parameter storage means are the image data branching circuit (11), the synchronizing signal branching circuit (15) and the non volatile memory (18) for holding parameters, respectively.

Next, the condition in which the brancher of this embodiment is used will be described with reference to FIG. 2 which is a block diagram showing the condition where the brancher is used according to the first embodiment, second embodiment and third embodiment of the present invention.

Figure 2:
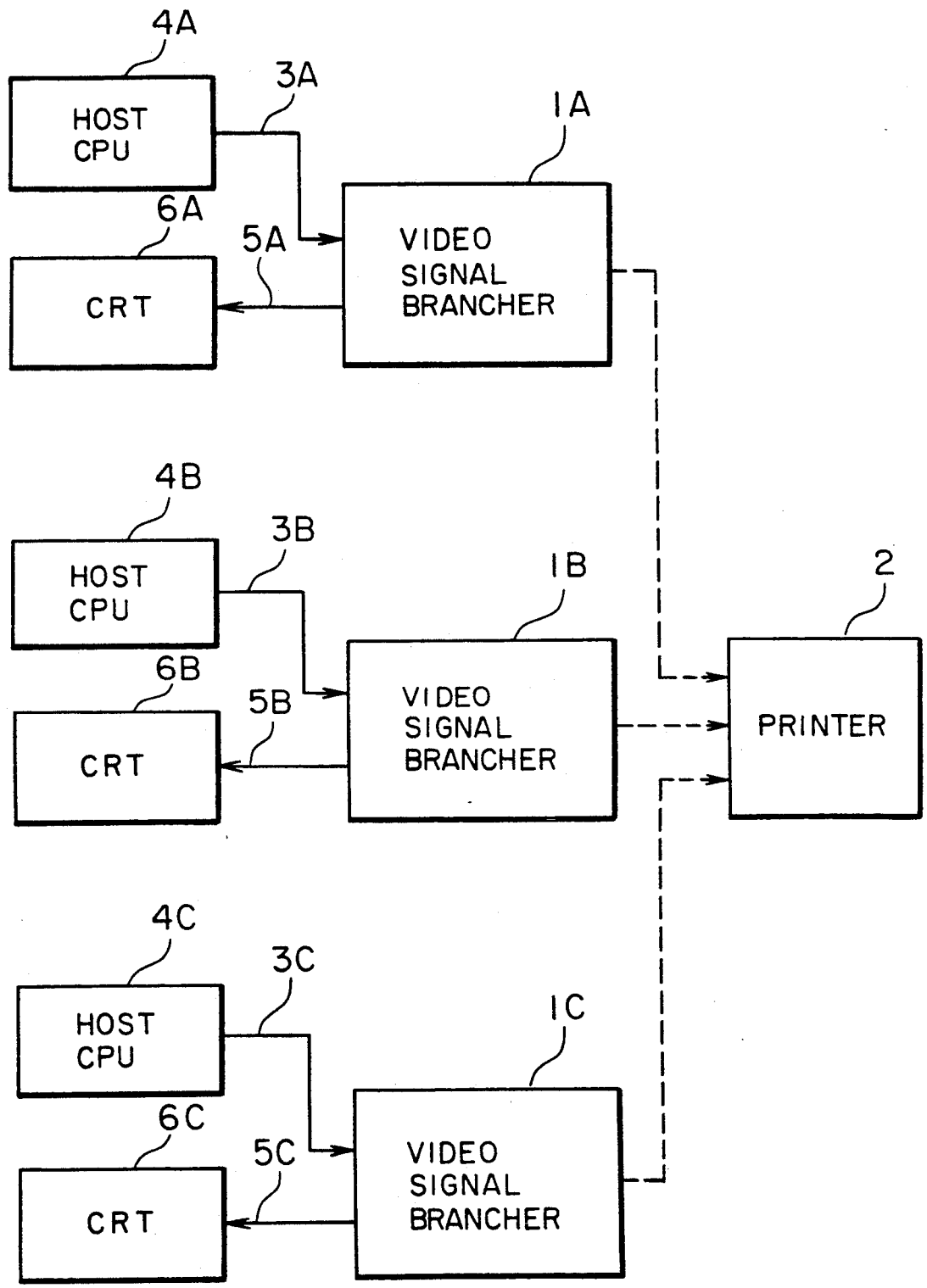
FIG. 2 is a block diagram illustrating the condition in which the device is used according to a first embodiment, a second embodiment and a third embodiment of the present invention.

In FIG. 2, the video signal brancher (1A) is connected to a host computer (4A) and to a CRT (6A) via A1 cable (3A) and A2 cable (5A).

Further, the video signal brancher (1B) is connected to a host computer (4B) and to a CRT (6B) via B1 cable (3B) and B2 cable (5B).

The video signal brancher (1C) is connected to a host computer (4C) and to a CRT (6C) via C1 cable (3C) and C2 cable (5C).

Here, the host computer (4A) produces a video signal in which the image data consists of an analog interlace signal and the synchronizing signal consists of an H.V separate signal. The host computer (4B) produces a video signal in which the image data consists of an analog non-interlace signal and the synchronizing signal consists of an H.V composite signal. Furthermore, the host computer (4C) produces a video signal in which the image data consists of a digital interlace signal and the synchronizing signal consists of an H.V composite signal.

The video signal branchers (1A), (1B) and (1C) have image data input terminals, synchronizing signal input terminals, second image data output terminals and second synchronizing signal output terminals corresponding to connectors of the cables, and hold parameters that correspond to video signals. Depending upon the kind of video signals, the parameters are written by a parameter writing device that is not shown onto the non-volatile memory (18) that holds the parameters. The parameters can be rewritten even by the printer (2).

When the video signals are to be printed, the operator needs only connect the video signal brancher (1A), (1B) or (1C) to the printer (2).

Figure 3:
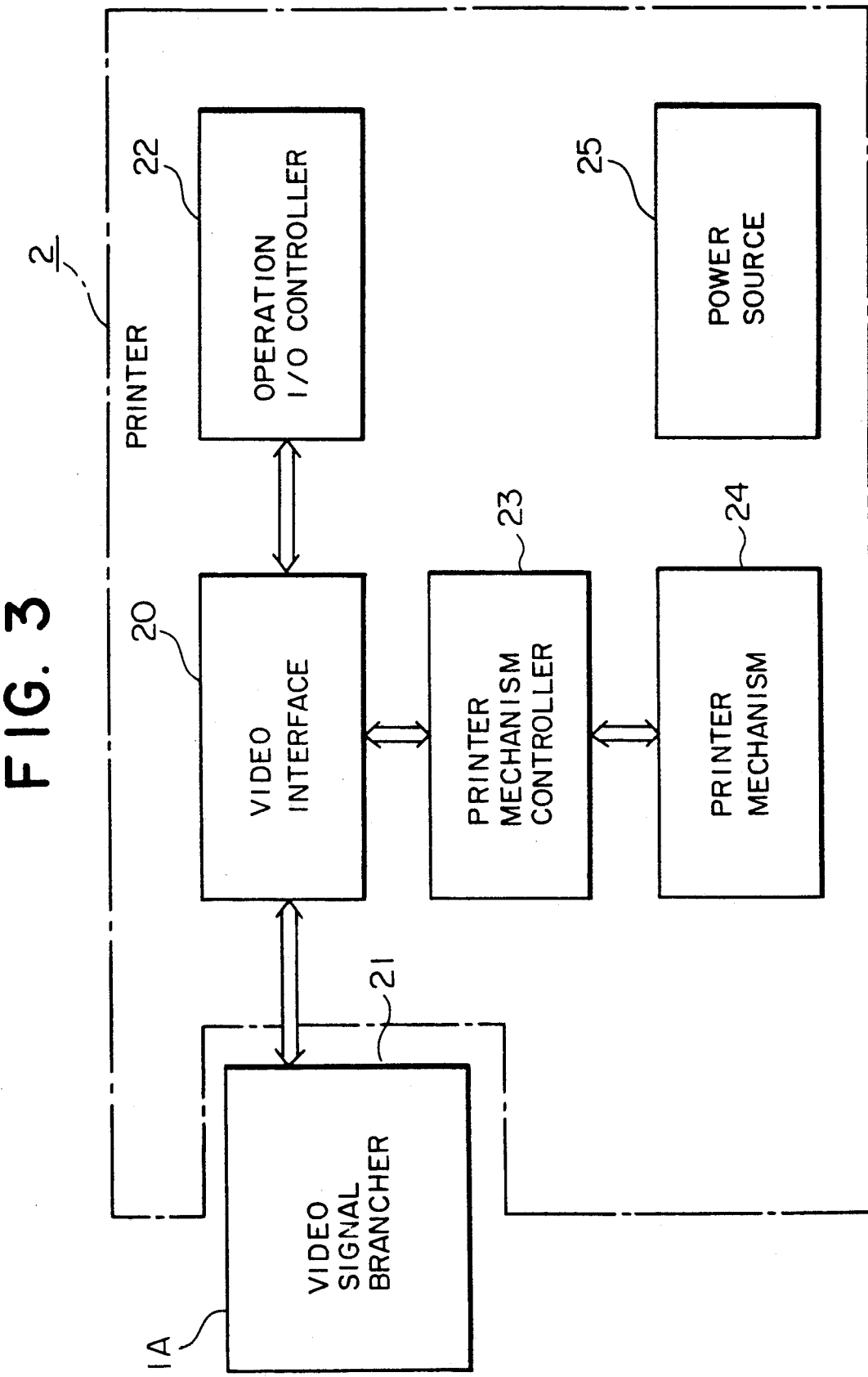
FIG. 3 is a block diagram which illustrates a printer that is connected to the first embodiment of the present invention.

Constitution of the printer (2) will now be described with reference to FIGS. 3 and 4. FIG. 3 is a block diagram showing the printer (2), and FIG. 4 is a wiring diagram showing the video interface (20).

In FIG. 3, the printer (2) is constituted by a video interface (20) connected to the video signal brancher (1A) that is inserted in a recessed portion (21) in a housing of the printer (2), an operation input/output controller (22) connected to the video interface (20), a printer mechanism controller (23) connected to the video interface (20), a printer mechanism (24) connected to the printer mechanism controller (23), and a power source (25).

Figure 4:
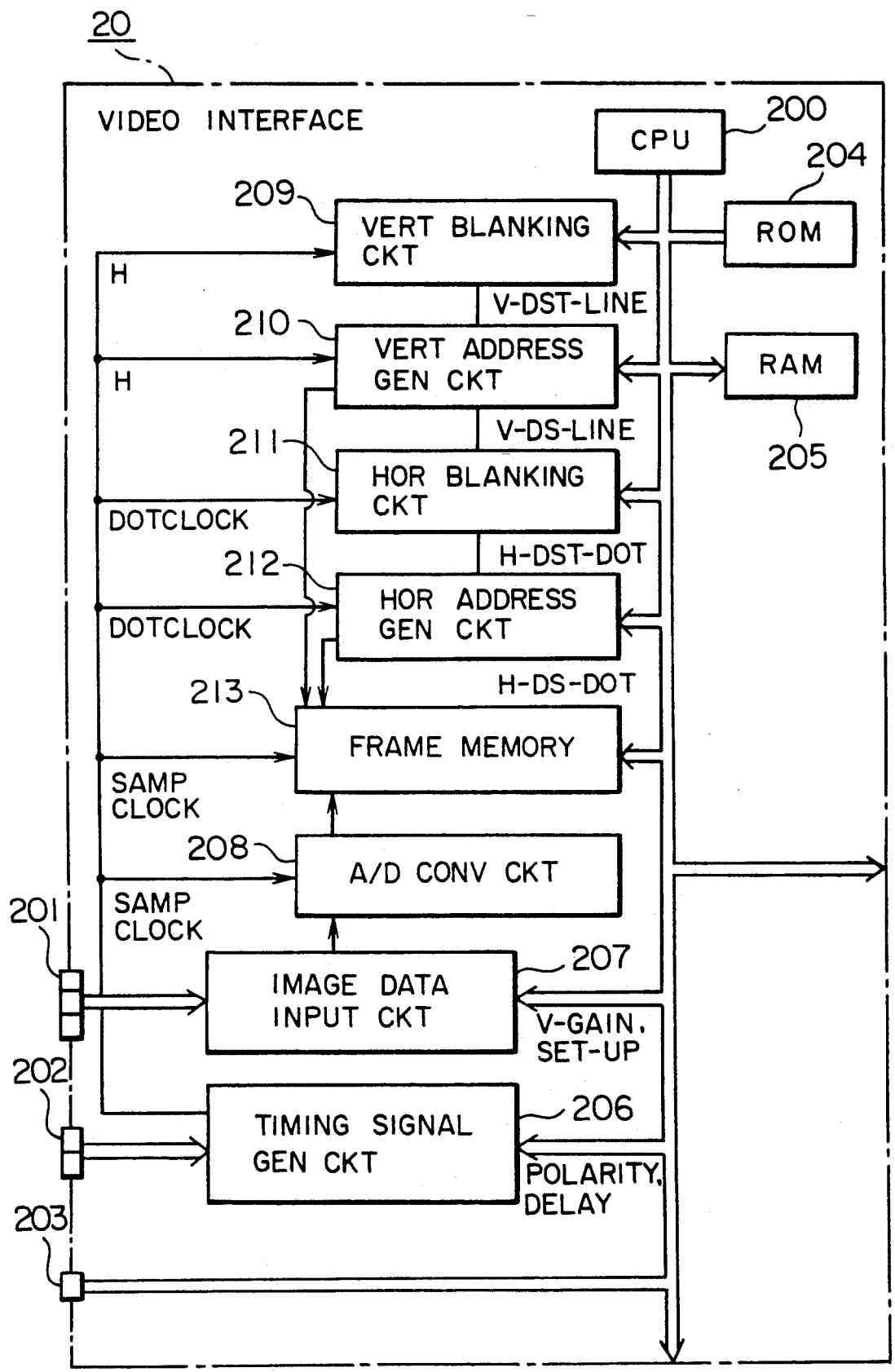
FIG. 4 is a wiring diagram illustrating a video interface of the printer.

In FIG. 4, the video interface (20) is constituted by a CPU (200), image data input terminals (201), synchronizing signal input terminals (202), a parameter input terminals (203), a ROM (204) connected to the CPU (200), a RAM (205) connected to the CPU (200), a timing signal generating circuit (206) connected to the CPU (200) and to the synchronizing signal input terminals (202), an image data input circuit (207) connected to the CPU (200) and to the image data input terminals (201), an A/D converter circuit (208) connected to the timing signal generating circuit (206) and to the image data input circuit (207), a vertical blanking circuit (209) connected to the CPU (200) and to the timing signal generating circuit (206), a vertical address generating circuit (210) connected to the CPU (200), to the timing signal generating circuit (206) and to the vertical blanking circuit (209), a horizontal blanking circuit (211) connected to the CPU (200), to the timing signal generating circuit (206) and to the vertical address generating circuit (210), a horizontal address generating circuit (212) connected to the CPU (200), to the timing signal generating circuit (206) and to the horizontal blanking circuit (211), and a frame memory (213) connected to the CPU (200), to the timing signal generating circuit (206), to the A/D converter circuit (208), to the vertical address generating circuit (210) and to the horizontal address generating circuit (212).

Operation of the printer (2) and, particularly, operation of the video interface (20) will now be described with reference to FIGS. 5 to 8 which illustrate parameters of video signals.

When the power source (25) rises, first, the CPU (200) reads the parameter of video signals from the parameter-holding non-volatile memory (18) of the video signal brancher (1A) via parameter input/output terminals (19) and parameter input terminal (203), and writes it onto the RAM (205).

Figure 5:
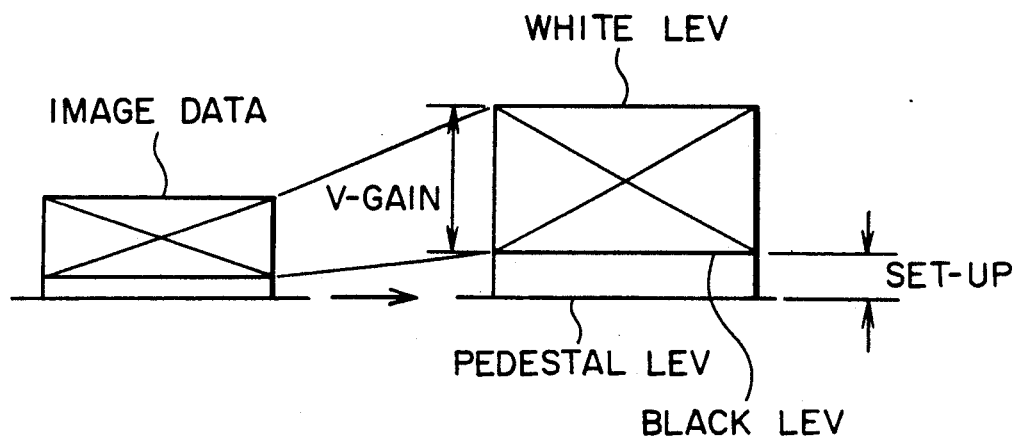
FIG. 5 is a diagram illustrating a video gain value and a set-up value in the parameters of video signals.
Figure 6:
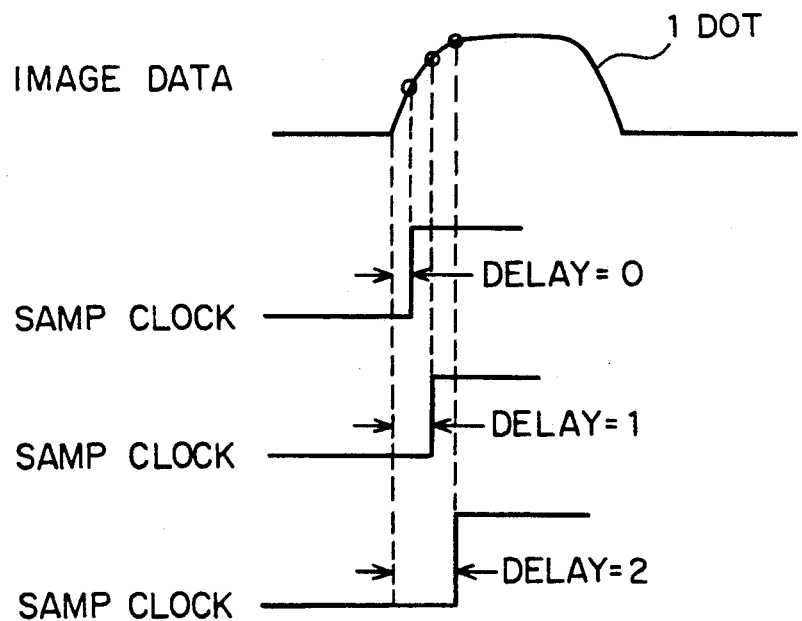
FIG. 6 is a diagram illustrating sampling delay values among the parameters.
Figure 7:
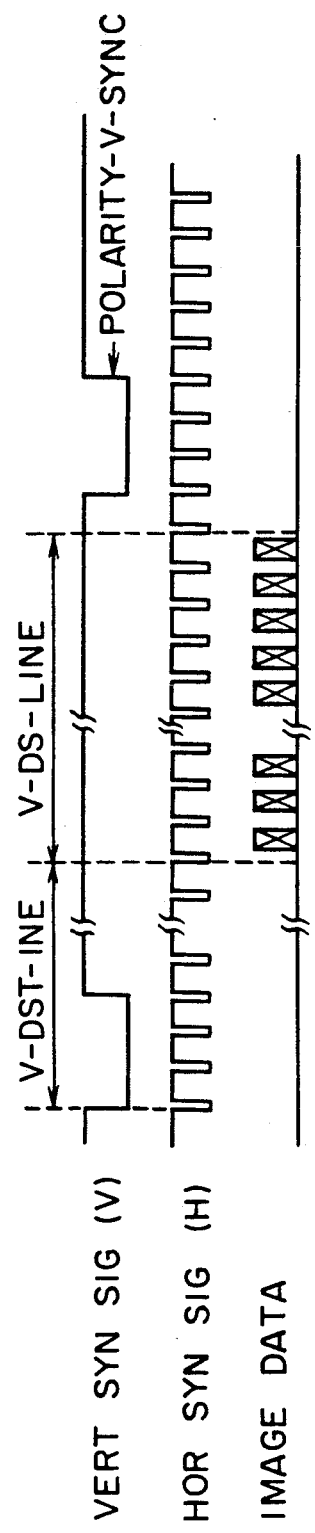
FIG. 7 is a diagram showing the number of vertical display start lines, the number of vertical display lines and the polarity of vertical synchronizing signals among the parameters.
Figure 8:
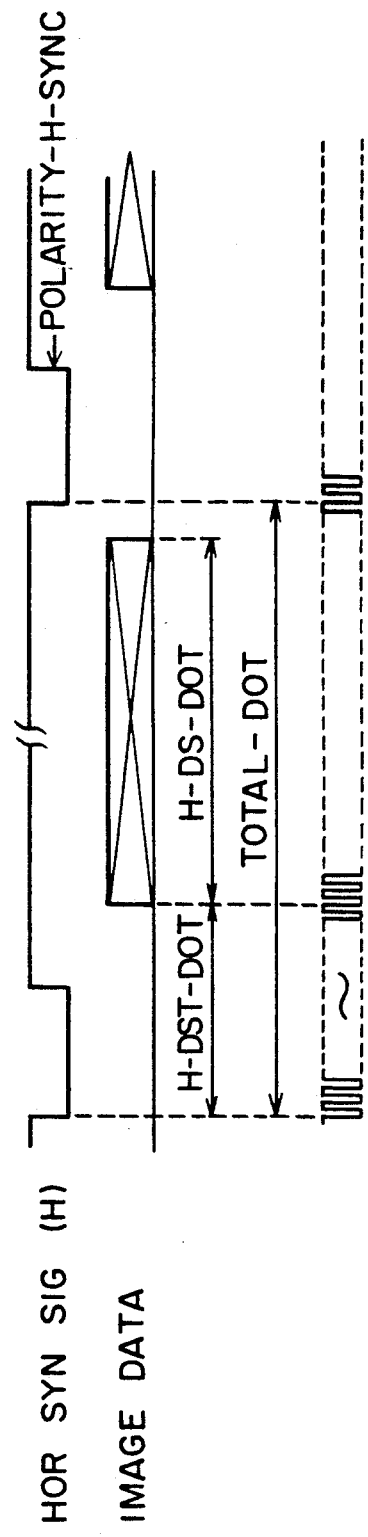
FIG. 8 is a diagram which is an enlargement of a portion of FIG. 7 and which illustrates the number of horizontal display start dots, the number of horizontal display dots, the number of horizontal total dots, and the polarity of horizontal synchronizing signals among the parameters.
Figure 9:
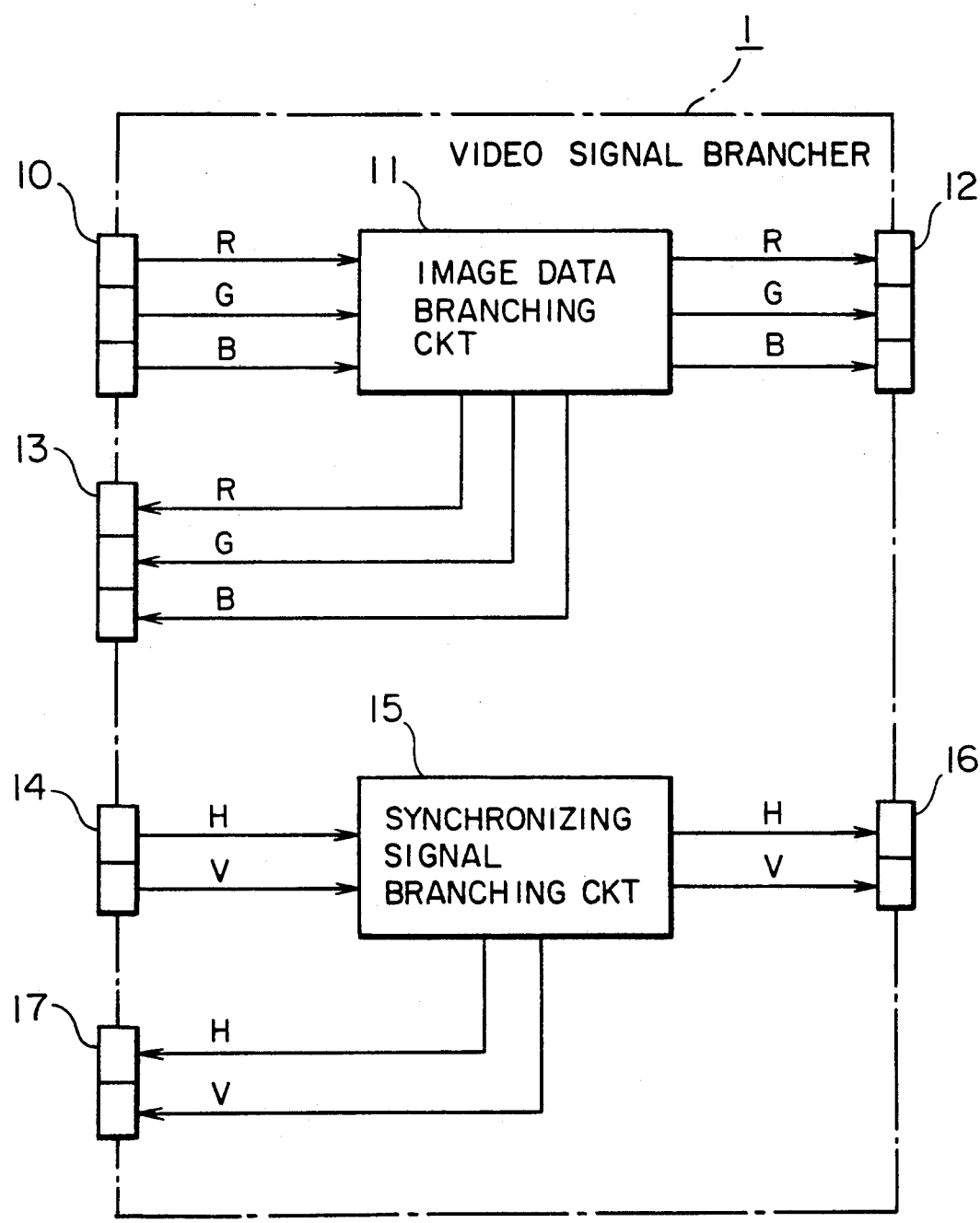
FIG. 9 is a block diagram of a conventional video signal brancher.
Figure 10:
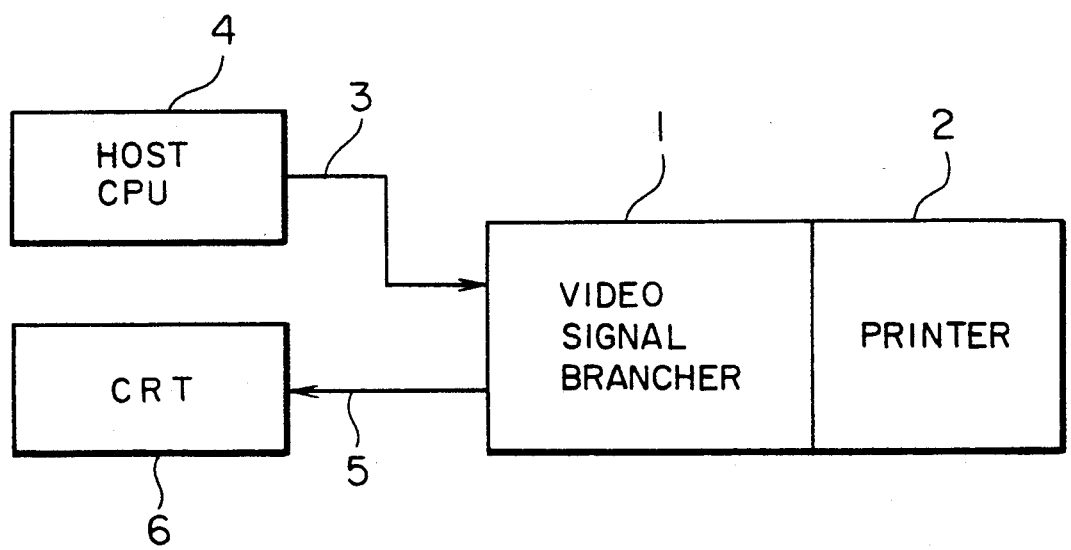
FIG. 10 is a block diagram showing the condition in which the conventional video signal brancher is used.

Here, the parameters include video gain values [V-GAIN] of the colors R, G, B in the image data and set-up values [SET-UP] as shown in FIG. 5, sampling delay values [DELAY] (a unit DELAY 1 represents, for example, 6 ns) as shown in FIG. 6, the number of vertical display start lines [V-DST-LINE], the number of vertical display lines [V-DS-LINE] and the polarity [POLARITY-V-SYNC] of vertical synchronizing signals (which is negative in FIG. 7) as shown in FIG. 7, and the number of horizontal display start dots [H-DST-DOT], the number of horizontal display dots [H-DS-DOT], the number of horizontal total dots [TO-TAL-DOT]and the polarity [POLARITY-H-SYNC] of horizontal synchronizing signals (which is negative in FIG. 8) as shown in FIG. 8.

The CPU (200) then supplies the parameters written onto the RAM (205) to each of the circuits in the video interface (20). That is, the parameters [POLARITY-V-SYNC, POLARITY-H-SYNC and DELAY] are supplied to the timing signal generating circuit (206), the parameters [V-GAIN and SET-UP]are supplied to the image data input circuit (207), the parameter [V-DST-LINE] is supplied to the vertical blanking circuit (209), the parameter [V-DS-LINE] is supplied to the vertical address generating circuit (210), the parameter [H-DST-DOT] is supplied to the horizontal blanking circuit (211), and the parameter [H-DS-DOT] is supplied to the horizontal address generating circuit (212).

In response to the parameters [POLARITY-V-SYNC, POLARITY-V SYNC and DELAY], the timing signal generating circuit (206) generates various timing signals from the vertical and horizontal synchronizing signals that are input via the synchronizing signal input terminals (202), and supplies them to each of the circuits.

In response to the parameters [V-DST-LINE and V-DS-LINE] and the horizontal synchronizing signal, the vertical blanking circuit (209) and the vertical address generating circuit (210) generate vertical address and supply it to the frame memory (213). In response to the parameters [H-DST-DOT and H-DS-DOT] and DOT CLK, on the other hand, the horizontal blanking circuit (211) and the horizontal address generating circuit (212) generate horizontal address and supply it to the frame memory (213).

In response to the parameters [V-GAIN and SET-UP], the image data input circuit (207) processes the image data input through the image data input terminals (201) in a manner as shown in FIG. 5, and supplies it to the A/D converter circuit (208).

The A/D converter circuit (208) subjects the image data to the A/D conversion in response to the sampling clock and supplies it to the frame memory (213).

The frame memory (213) writes digital image data based on vertical and horizontal addresses and on sampling clocks.

As required, thereafter, the image data written onto the frame memory (213) are printed.

Based on the parameters held in the video signal branchers, the printer (2) picks up image data from various video signals.

According to the present invention as described above, video signals having dissimilar parameters are printed by the printer without the need of at all changing the side of the printer but by simply exchanging the video signal brancher to meet the video signals. Therefore, the printer prints the video signals easily, efficiently and vividly.

What is claimed is:

1. A video signal brancher for facilitating transmission of video signals between a host computer and a printer, comprising:
    an image data branching circuit for branching image data contained in the video signals input from image data input terminals and sending the data to first image data output terminals and to second image data output terminals;
    a synchronizing signal branching circuit for branching synchronizing signals contained in the video signals input from synchronizing signal input terminals and sending the synchronizing signals to first synchronizing signal output terminals and to second synchronizing signal output terminals; and
    parameter storage means for storing video signal parameters, said parameter storage means having an output terminal in communication with a printer which outputs the stored parameters which enable the printer to print video images corresponding to the image data and the synchronizing signals of the video signal.

2. A video signal brancher according to claim 1, where the video signal includes an analog non-interlace signal.

3. A video signal brancher according to claim 1, where the synchronizing signal comprises an H.V composite signal.

4. A video signal brancher according to claim 1, where the video signal includes an analog interlace signal.

5. A video signal brancher according to claim 1, where the video signal includes a digital interlace signal.

6. A video signal brancher according to claim 1, where the synchronizing signal comprises a is an H.V separate signal.

7. A video signal brancher for facilitating transmission of video signals between a host computer and a printer, comprising:
    an image data branching circuit for branching image data contained in the video signals input from image data input terminals to first and second image data output terminals,
    a synchronizing signal branching circuit for branching synchronizing signals contained in the video signals input from synchronizing signal input terminals to first and second synchronizing signal output terminals,
    parameter storage means including a non-volatile memory and a parameter input/output terminal for storing parameters of the video signals;
    a video interface which reads and processes video signal parameters output from said parameter storage means and selects video images to be printed based on the image data of said image data branching circuit and the synchronizing signals from the synchronizing signal branching circuit.

* * * * *